United States Patent
Strand

[11] Patent Number: 5,964,555
[45] Date of Patent: Oct. 12, 1999

[54] MILLING TOOL AND CUTTER HEAD THEREFOR

[75] Inventor: Bengt Strand, Fagersta, Sweden

[73] Assignee: Seco Tools AB, Fagersta, Sweden

[21] Appl. No.: 08/974,826

[22] Filed: Nov. 20, 1997

[30] Foreign Application Priority Data

Dec. 4, 1996 [SE] Sweden .................................. 9604456

[51] Int. Cl.[6] .................................................. B23C 1/00
[52] U.S. Cl. .............................. 409/234; 279/93; 407/34; 408/228
[58] Field of Search ................................... 408/227, 228; 407/34, 42, 47, 53, 54; 409/234; 279/93, 89, 102, 103

[56] References Cited

U.S. PATENT DOCUMENTS

| | | | |
|---|---|---|---|
| 3,708,843 | 1/1973 | Erkfritz | 29/105 A |
| 4,168,730 | 9/1979 | Keller | 144/87 |
| 4,585,380 | 4/1986 | Naito | 409/234 |
| 4,687,388 | 8/1987 | Yokota et al. | 408/227 |
| 4,738,130 | 4/1988 | Homma | 279/93 |
| 4,759,667 | 7/1988 | Brown | 408/227 |
| 4,850,759 | 7/1989 | Strand et al. | . |
| 4,930,945 | 6/1990 | Arai et al. | 407/40 |
| 4,948,306 | 8/1990 | Wiedner et al. | 408/227 |
| 5,116,166 | 5/1992 | Rinas | 407/57 |
| 5,213,452 | 5/1993 | Kirby | 407/42 |
| 5,265,989 | 11/1993 | Stock | 408/227 |
| 5,423,640 | 6/1995 | Lindblom et al. | 408/227 |
| 5,474,407 | 12/1995 | Rodel et al. | 408/227 |
| 5,536,119 | 7/1996 | Werner et al. | 407/42 |
| 5,580,194 | 12/1996 | Satran et al. | 407/47 |

*Primary Examiner*—Andrea L. Pitts
*Assistant Examiner*—Adesh Bhargava
*Attorney, Agent, or Firm*—Burns, Doane, Swecker & Mathis, L.L.P.

[57] ABSTRACT

A tool for rotary chip removal machining includes a cutting head, a retention element and a shank. The cutting head and the retention element comprise overlapping hooks for mounting the cutting head in the shank. The cutting head comprises two integral major cutting edges, each major cutting edge including a substantially straight edge and a convexly curved edge. The convex edge is disposed ahead of the straight edge and extends radially therebeyond.

13 Claims, 2 Drawing Sheets

டிதிக்க5,964,555

MILLING TOOL AND CUTTER HEAD THEREFOR

BACKGROUND OF THE INVENTION

The present invention relates to a milling tool for rotary chip removal machining and to a cutting head for the.

It is previously known through the commonly-owned Strand et al. U.S. Pat. No. 4,850,759 to provide a solution to the problem of providing small-dimensioned milling tools with interchangeable cutting edges. However in some cases it has become apparent that during the milling of profiles in tool steel, the cutting velocity during upwards ramping is not especially high. This depends on the maximum cutting depth during upwards ramping being relatively small in the known tool.

It is furthermore known to provide end milling cutters with screwed-in, circular cutting inserts to be used inter alia during upwards ramping. Since the dimensions most often are small, the hollow inserts become relatively weak, which has resulted in tool breakage.

OBJECTS OF THE INVENTION

One object of the present invention is to provide a tool which solves the above-mentioned problems.

Another object of the present invention is to provide a tool which combines the advantages of circular cutting inserts with favorable strength.

Still another object of the present invention is to provide a tool which easily cuts in the work piece.

Still another object of the present invention is to provide a cutting head which enables upwards ramping with a high cutting velocity.

SUMMARY OF THE INVENTION

These and other objects of the present invention are realized by a milling tool for rotary chip removal machining comprising a shank defining an axis of rotation, a cutting head mounted in the shank and projecting forwardly therefrom along the axis, and a retention element for retaining the cutting head within the shank. A rear portion of the cutting head includes a generally forwardly facing surface. The retention element is mounted in the shank and includes a generally rearwardly facing surface engaging the generally forwardly facing surface of the cutting head. The cutting head includes at least one and not more than six major cutting edges. The major cutting edge includes a straight portion extending in a generally front-to-rear direction, and a convex portion disposed axially ahead of the straight portion and projecting radially outside thereof.

The present invention also relates to the cutting head per se.

BRIEF DESCRIPTION OF THE DRAWINGS

The objects and advantages of the invention will become apparent from the following detailed description of a preferred embodiment thereof in connection with the accompanying drawing in which like numerals designate like elements, and in which.

DETAILED DESCRIPTION OF A PREFERRED EMBODIMENT OF THE INVENTION

Figure 1:
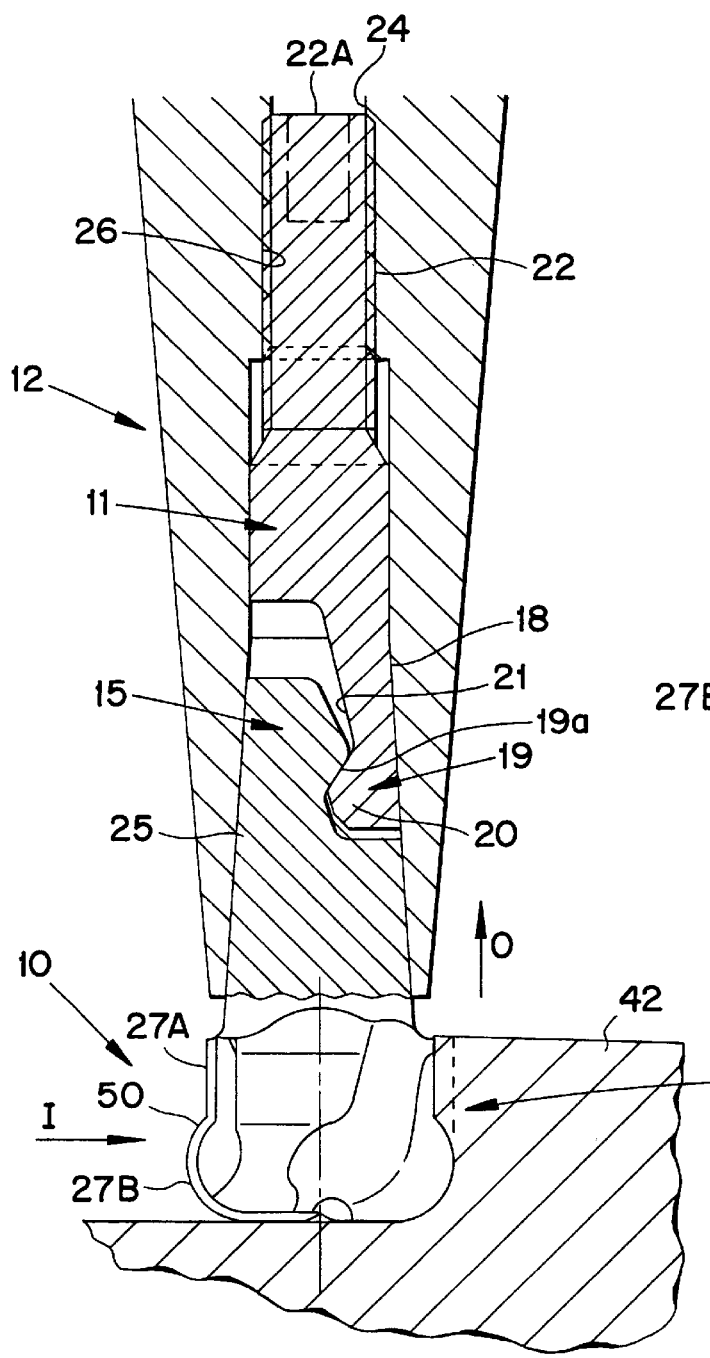
FIG. 1 shows a tool according to the present invention in an assembled condition, partly in cross-section, in engagement with a workpiece.

The embodiment of a tool according to the present invention shown in FIG. 1, comprises a cutting head 10, a retention member in form of a locking screw 11, and a shank 12 in which the cutting head 10 and locking screw 11 are mounted. The rear portion 15 of the cutting head is hook-shaped and includes a forwardly facing surface 15a engaged by a rearwardly facing surface 19a of a hook-shaped forward portion 19 of the locking screw 11.

Figure 1A:
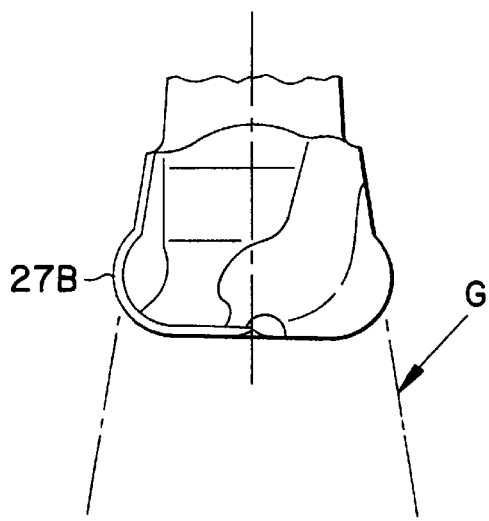
FIG. 1A depicts an alternative shape of a main cutting edge of the tool.

The cutting head 10 is provided with cutting edges at the end 13 thereof facing away from the shank 12. A preferred shape of the cutting head 10 is shown in detail in FIGS. 2A–4. The cutting head 10 is performed of hard material, preferably cemented carbide and comprises two major cutting edges 27. The number of major cutting edges may be from one to six. Each major cutting edge 27 comprises a front-to-rear extending straight edge 27A and a convexly curved, preferably part-circular edge 27B, and is formed along the intersection line of a clearance surface 28A, 28B and a chip surface 29. The straight edges 27A lie in a common, imaginary cylinder, which is concentric with the axis of rotation CL of the cutting head and tool. Alternatively, the straight cutting edges 27A' may be arranged in an imaginary truncated cone G (FIG. 1A), the apex of which faces the shank 12.

Figure 2A:
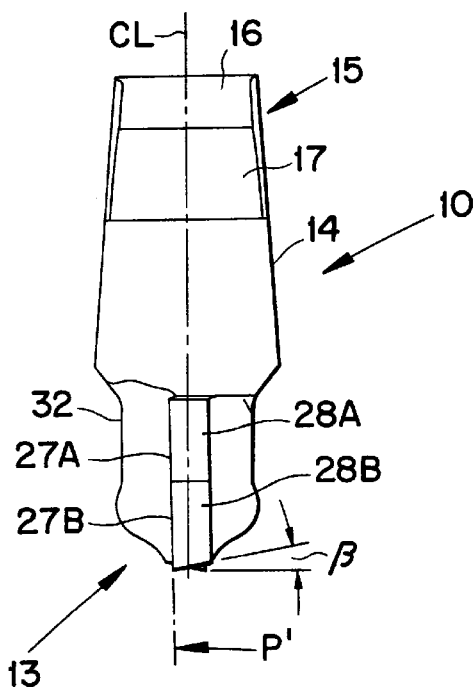
FIGS. 2A and 2B show side views of a cutting head according to the present invention, more in detail.
Figure 2B:
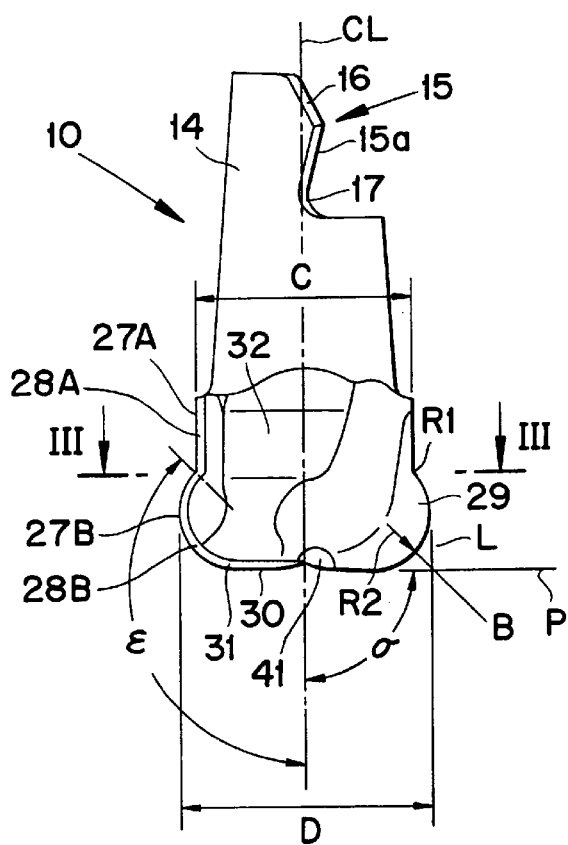
Figure 4:
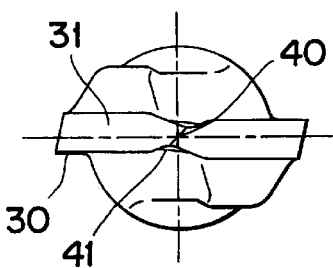
FIG. 4 shows a top view of the cutting head.
Figure 3:
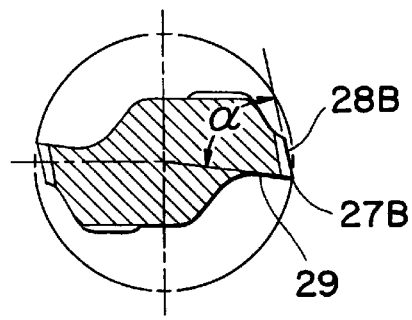
FIG. 3 shows a cross section taken along the line III—III in FIG. 2.

The diametrical distance C between the major cutting edges is normally in the range of 6–16 mm. Each curved cutting edge 27B is disposed in its entirety in a plane P' as shown in FIG. 2A and connects to an associated straight edge 27A via a corner having a radius R1 of maximum 1 mm. The curved edges 27B have a circular extension from the radius R1 to a plane P perpendicular to the center axis CL. Each curved edge 27B is defined by a radius R2, the center of which lies on a line B which bisects a forwardly facing portion of the curved edge 27B. That is, the bisector B bisects an imaginary corner formed by the plane P and a line L touching the radially outermost point of the curved edge 27B, said line being parallel to the rotational axis CL. A major portion of the curved edge 27B is provided behind (i.e., upwardly in FIG. 2B) the bisector while a minor part thereof is provided in front of the bisector.

The diametrical distance D between the curved edges 27B is some millimeters larger than the distance C. Each cutting edge extends for more than 90°, whereby a portion 50 of the curvature faces rearwardly, as shown in FIG. 1. Each curved cutting edge 27B transforms into a minor cutting edge 30 which extends radially inwards substantially in the plane P. The radius R2 is less than one half of the diameter D, normally in the range of 1–6 mm, and has a center spaced radially outwardly from the rotational axis CL. The minor cutting edge 30 forms an angle σ with the rotational axis CL which is 90° or slightly less to improve the cutting properties during milling.

Each chip surface 29 is substantially concavely formed and extends from the major cutting edge 27 radially inwards and from the minor cutting edge 30 in a direction axially inwardly away from the front end 13 of the cutting head. The chip surface 29 forms an acute angle α, of 60° to 80° with the clearance surface 28A, 28B. The minor cutting edge 30 is formed at the intersection of the chip flute 29 and a clearance bevel 31 and its radial extension commences radially inside the imaginary cylinder. The minor cutting edge 30 connects to a cross-cutting edge 40 which intersects the rotational axis CL of the cutting head such that the tool shall be able to drill into the work piece during milling. The length of the cross-cutting edge 40 is 0.5–1.5 mm. Cut-out surfaces 41 are provided in line with the cross-cutting edge 40 in order to diminish the feed force during drilling. The clearance bevel 31 has a clearance angle β, of 10° to 20°, and is preferably smaller than the clearance angle α of the major cutting edge to allow high feed during inwards ramping or drilling. The radial extension of the minor cutting edge 30 and the convex edge 27B can be described by an angle ε, FIG. 2B, which is from 120° to 140°. It should be noted that by the term "ramping" is here meant milling with feed directions in all angles relative to the rotational axis CL which is not the conventional drilling direction.

At the rear end facing towards the shank 12 the cutting head is provided with a first conical portion 14, which is provided with the hook 15. The hook 15 comprises a first lip 16 as well as a first recess 17 that includes the surface 15a. The intermediate portion of the cutting head 10 is provided with a key grip 32, the application of which is explained below.

The locking screw 11, which preferably is performed of steel, has a conical portion 18 at the end facing towards the cutting head, which is provided with the second hook 19, which is intended to cooperate with the first hook 15. As shown in FIG. 1 the provision of the second hook 19 implies that a substantial part of the second conical portion 18 has been removed. The second hook 19 comprises a second lip 20 as well as a second recess 21 that includes the surface 19a. In active position the first lip 16 cooperates with the second recess 21 and the second lip 20 with the first recess 17.

Axially inside the second hook 19, in the axial direction, the locking screw 11 has an externally threaded, preferably cylindrical portion 22. An Allen key grip can be provided at the axially innermost end 22A of the locking screw 11, whereby loosening or tightening of the locking screw 11 through the internal channel 24 of the shank 12 is made possible. Normally however tightening or loosening of the locking screw is accomplished through the external key grip 32. Alternatively the thread 22 may be arranged at an end of a releasable sleeve, the other end of which then is provided with an external thread as well as a key grip.

The shank 12 is provided with a conical seat 25 at the end facing towards the cutting head 10, which receives the first and second conical portions 14 and 18 of the cutting head 10 and the locking screw 11, respectively. Inside the conical seat 25 the shank 12 has a substantially cylindrical, internally threaded portion 26, which cooperates with the external threaded portion 22 of the locking screw 11.

Mounting and dismounting of the tool is described in U.S. Pat. No. 4,850,759, which hereby is incorporated by reference into the present description. Cooperation between the external thread 22 and the internal thread 26 entails that the locking screw 11 and thereby also the cutting head 10 are displaced axially into in the shank 12 until the cone-shaped portion 14 of the cutting head comes into abutment against the conical seat 25, i.e. the position according to FIG. 1 has been achieved. The cutting head 10 is now anchored in the shank 12 in a satisfactorily manner.

The threads 22 and 26 are designed as right-hand threads in tools for right-hand cutting and as left-hand threads in tools for left-hand cutting.

In the above described embodiment the cone angle for the cutting head and seat should be less than 25°. In addition it shall be pointed out that the described embodiment relates to milling cutters, i.e. tools which rotate about their longitudinal center axes. Milling cutters with small cutting portions are expected to be the domineering area of application for the present invention.

From FIG. 1 it is evident that if the milling tool shall ramp a shoulder in the work piece 42 the tool is brought against the shoulder in the direction of the arrow I during rotation such that the tool will cut itself into the position shown in FIG. 1. Then the tool is rotated while being fed, perpendicularly outwards from the work piece in the direction of the arrow O and therefore the new border surface of the shoulder will become the one depicted by the dotted line in the figure. By means of the circular major cutting edge a relatively sharp corner, having the radius R2, can be obtained while the tool can cut material also in direction towards the spindle, not shown.

The milling tool according to the present invention thus can perform milling as conventional cemented carbide end mills and yet can cut material during a returning stroke towards the spindle. During the latter, operation tension arises in the cutting head and therefore the chosen principal for retention is superior to other known solutions.

The invention is in no way limited to the above described embodiments but may be freely varied within the limits of the subsequent claims.

What is claimed is:

1. A cutting head for rotary chip removal machining, the cutting head defining an axis of rotation and having a front end and a rear end and comprising a rear mounting portion having a surface adapted for engagement by a retention element, and at least one and no more than six integral major cutting edges disposed at said front end of the cutting head, each major cutting edge including a straight portion extending in a generally front-to-rear direction, and a convexly curved portion disposed ahead of the straight portion and projecting radially from said axis of rotation therebeyond, the entire convexly curved portion being disposed in a single plane.

2. The cutting head according to claim 1 wherein there are at least two major cutting edges, the respective straight portions thereof lying on an imaginary cylinder coaxially arranged with respect to the axis.

3. The cutting head according to claims 1 wherein there are at least two major cutting edges, the respective straight portions thereof lying on an imaginary cone whose apex projects rearwardly.

4. The cutting head according to claim 1 wherein the cutting head is formed of cemented carbide and includes a clearance surface and a chip surface intersecting one another for forming the straight and convex portions.

5. The cutting head according to claims 4 wherein the mounting portion is hook-shaped.

6. The cutting head according to claim 5 wherein the retention member includes a hook-shaped front portion on which the generally rearwardly facing surface is disposed; the cutting head including a hook-shaped rear portion on which the generally forwardly facing surface is disposed; the cutting head formed of cemented carbide; the retention element formed of steel and having an external screw thread releasably threadedly mounted in the shank; the shank forming a conical seat tapering down in a rearward direction; the cutting head including a conical mounting portion received in the conical seat.

7. The cutting head according to claim 1 wherein the convexly curved portion has a curvature extending greater than ninety degrees, whereby a portion of the curvature faces rearwardly.

8. The cutting head according to claim 7, wherein the convexly curved portion is curved about a center of curvature spaced radially outwardly from the axis of rotation.

9. The cutting head according to claim 1 wherein the convexly curved portion is curved about a center of curvature spaced radially outwardly from the axis of rotation.

10. The cutting head according to claim 1 wherein the cutting edge further includes a radially extending front portion extending in a plane oriented perpendicularly to the axis of rotation.

11. A cutting head for rotary chip removal machining, the cutting head defining an axis of rotation and having a front end and a rear end and comprising a rear mounting portion having a surface adapted for engagement by a retention element, and at least one and no more than six integral major cutting edges disposed at said front end of the cutting head, each major cutting edge including a straight portion extending in a generally front-to-rear direction, and a convexly curved portion disposed ahead of the straight portion and projecting radially from said axis of rotation therebeyond, the convexly curved portion having a curvature extending for greater than ninety degrees, whereby a portion of the curvature faces rearwardly.

12. The cutting head according to claim 11 wherein the convexly curved portion is curved about a center of curvature spaced radially outwardly from the axis of rotation.

13. A cutting head for rotary chip removal machining, the cutting head defining an axis of rotation and having a front end and a rear end and comprising a rear mounting portion having a surface adapted for engagement by a retention element, and at least one and no more than six integral major cutting edges disposed at said front end of the cutting head, each major cutting edge including a straight portion extending in a generally front-to-rear direction, and a convexly curved portion disposed ahead of the straight portion and projecting radially from said axis of rotation therebeyond, the convexly curved portion being curved about a center of curvature spaced radially outwardly from the axis of rotation.

* * * * *